March 3, 1936. J. P. WATSON 2,033,017
HYDRAULIC RAM APPARATUS
Filed March 8, 1934 2 Sheets-Sheet 1
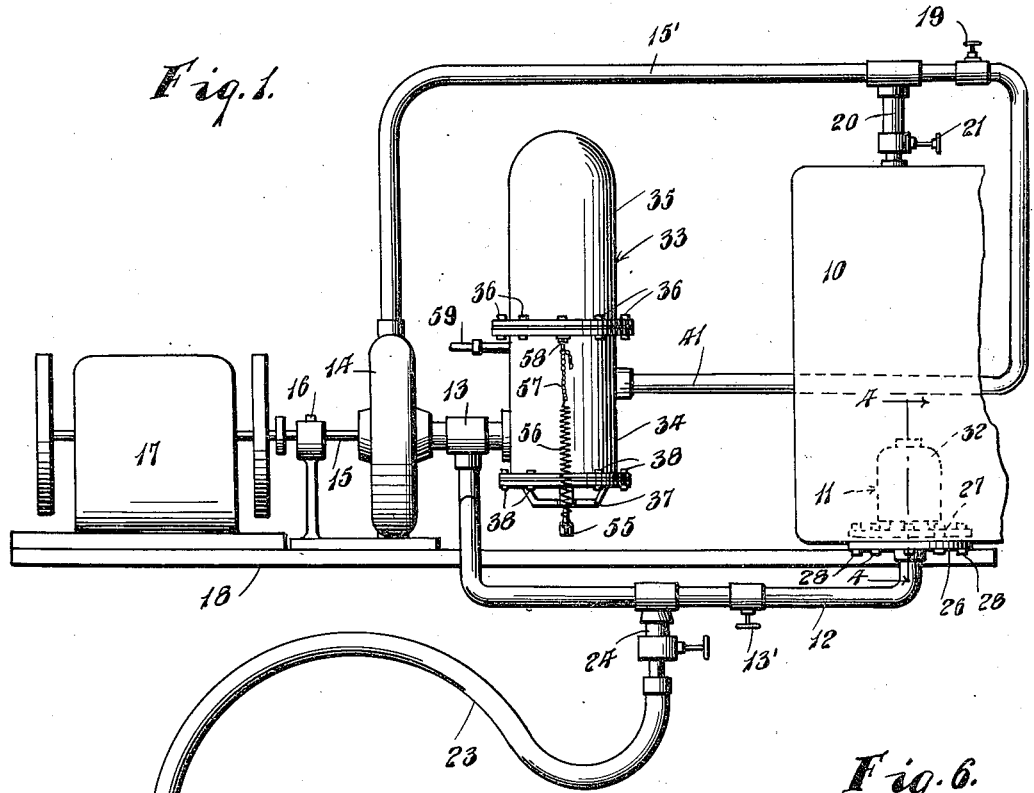
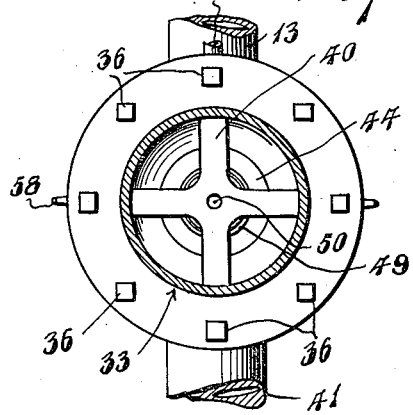
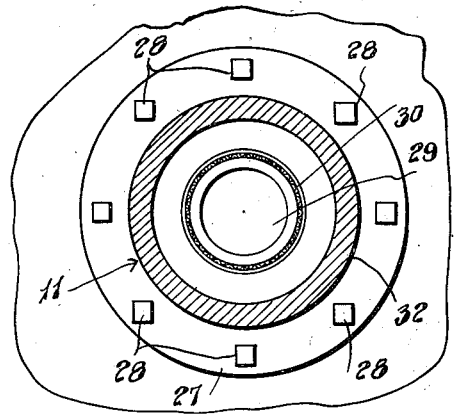
Inventor
John P. Watson.
By L. F. Rudulph Jr.
Attorney

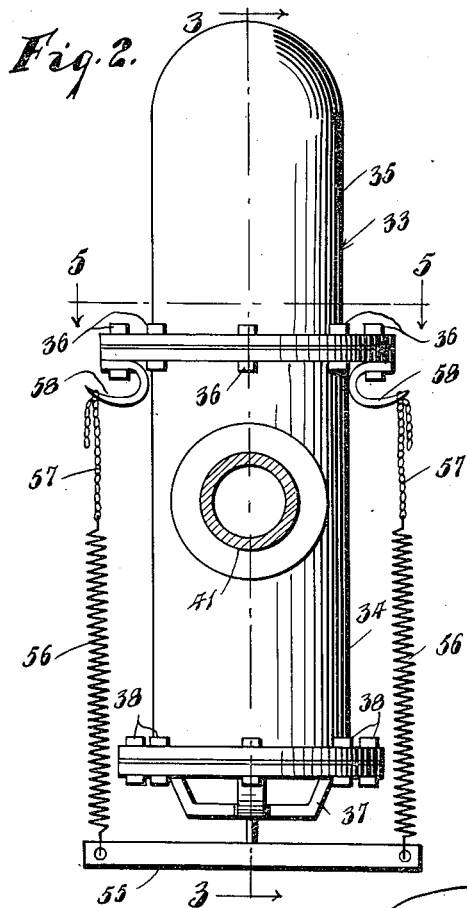
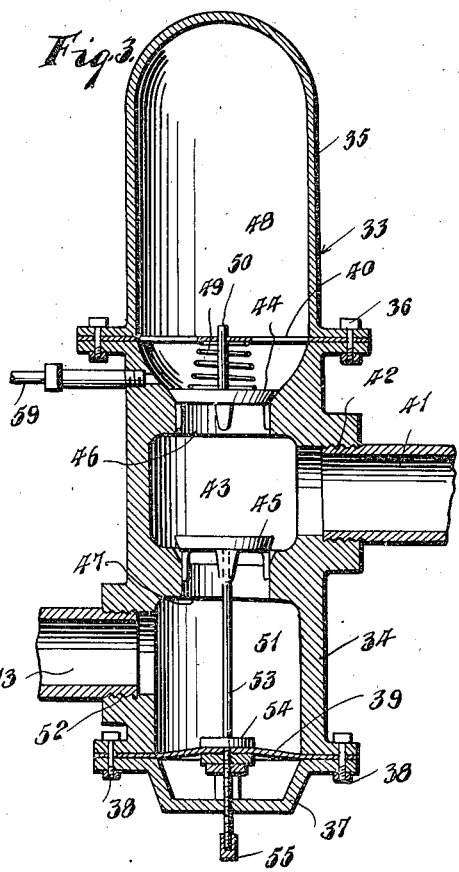
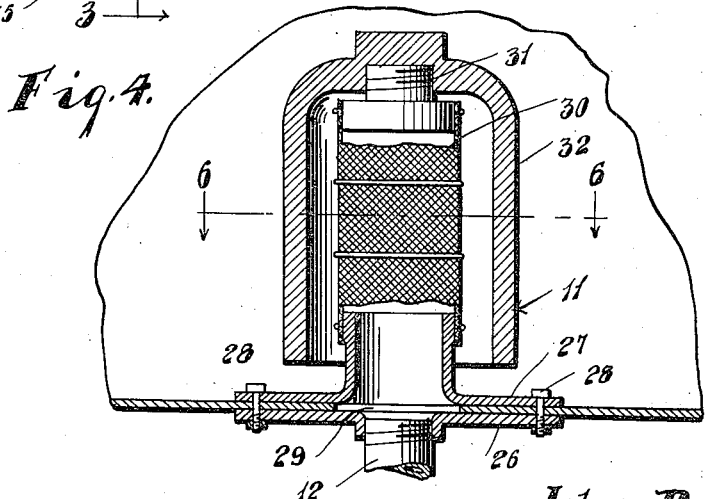

Patented Mar. 3, 1936

2,033,017

UNITED STATES PATENT OFFICE 2,033,017

HYDRAULIC RAM APPARATUS

John P. Watson, Elsa, Tex.

Application March 8, 1934, Serial No. 714,709

7 Claims. (Cl. 103—5)

This invention relates to an hydraulic ram apparatus and it aims to provide a novel mechanism adapting a ram to a wider range of usefulness, increasing the efficiency of the ram and generally providing a more compact organization.

The more specific objects and advantages will in part be pointed out and otherwise become apparent from a consideration of the description following taken in connection with accompanying drawings illustrating an operative embodiment.

In said drawings:—

Figure 1 is a view of the improved apparatus in side elevation;

Figure 2 is an enlarged elevation of the ram taken at a right angle to Figure 1;

Figure 3 is a vertical sectional view taken on the line 3—3 of Figure 2;

Figure 4 is a vertical sectional view taken on the line 4—4 of Figure 1;

Figure 5 is a horizontal sectional view taken on the line 5—5 of Figure 2; and

Figure 6 is a horizontal sectional view taken on the line 6—6 of Figure 4.

Referring specifically to the drawings, 10 designates a tank or reservoir for containing a liquid material adapted to be sprayed, for instance a lime and water solution. Such solution is withdrawn through an outlet means 11, pipe or conduit 12, a pipe or conduit 13 located at the suction end of a centrifugal pump 14, the impeller of which is rotated by a shaft 15 suitably journaled as at 16 and driven by any suitable prime mover at 17. All of the parts are preferably mounted on a common support 18. The outlet or discharge pipe from the centrifugal pump 14 is shown at 15' leading to pipe 41 hereinafter described, and which discharge pipe has a cut off valve 19 therein.

Pipe 15' has a branch 20 leading to the reservoir 10 which is equipped with a cut off valve 21.

In the pipe 12 a cut off valve 13' is provided which may be closed when desired, to enable replenishing of water in the reservoir through an inlet nozzle 22 of a hose 23 connected to a pipe 24 communicating with the pipe 12 and which contains a normally closed check valve 25, capable of being opened by upward suction to enable the water to pass the same into the pipe 12, pipe 13, pump 14, pipe 15 and pipe 20 into the reservoir 10 when the valve 21 is opened. When valve 21 is opened, valve 19 will be closed and vice versa.

Said inlet means 11 comprises outer and inner couplings 26 and 27, bolted at 28 to the bottom wall of reservoir 10 in a leak-proof manner, in line with an opening 29 therethrough. Connected to the section 27, is a cylindrical screen 30 carrying a screw-threaded stud 31 to which a bell 32 is detachably screwed or otherwise fastened.

The ram is shown at 33 and consists of a body section 34, head section 35 bolted thereto as at 36 in a leak-proof manner, and a base section 37 bolted to the body section as at 38, in a leak-proof manner, which bolts 38 secure a flexible diaphragm 39 in place. Bolts 36 secure a spider 40 in place.

Water flowing through conduit 15' is adapted to enter the body section 34 through a drive or supply pipe 41 connected thereto and screwed to that section as at 42. The receiving chamber of the body 34 is designated 43 and has therein vertically alined or opposed check valve 44 and obstruction valve 45, said valves respectively, coacting with seats in passages 46 and 47. Passage 46 leads to the head 35 which primarily forms a compression chamber 48. Valve 44 is normally in closed position and urged to its seat through the expansion of a coil spring 49 engaging the same and the spider 40 and the valve being guided in movement by a stem 50 thereon passing loosely through said spider 40. Passage 47 communicates with the low pressure chamber 51 in the lower part of the valve body or cage 34, and the pipe 13 is screw-threaded to such body or cage 34 as at 52 in communication with the chamber 51.

Normally valve 45 is in open position, raised from its seat. The valve 45 has a stem 53 depending through the diaphragm 39 and base 37, being secured in a water-tight manner as at 54 to the diaphragm. Below the base 37, stem 53 is screw-threaded to a cross bar 55 which is curved upwardly under adjustable spring tension, as by means of coil springs 56 connected thereto and in turn connected to chains 57, and whose links are selectively attachable to hooks 58 secured in place by certain of the bolts 36.

The water which enters the compression chamber 48, is led therefrom through a suitable conduit 59 to any suitable place of use.

Referring now more particularly to the operation of the ram 33, the water flows thereto through the pipe 41 from pipe 15' so that it will enter the chamber 43 under considerable velocity. Such water will flow downward past valve 45 through passage 47 into pipe 13. When the flow of such water is sufficiently great, said obstruction valve 45 will be forced downward, that is closed, overcoming the resistance offered by the coil spring 56. When said valve 45 seats, the column of flowing water possesses enough kinetic energy to force a portion of the water upwardly past the check valve 44 and into the compression chamber 48. This produces a ramming effect and upon completion thereof there is a back surge of the water in the supply pipe 41 conduit 15' which is connected thereto, which permits the springs 56 to raise the valve 45 from its seat. The flow of the water again begins through the ram at pipe 41, until the process described is repeated. The chains 57 as described enable the springs to be secured with the desired tension. The water under pressure in the compression tank 48 is led to the desired place through the outlet pipe 59. During the operation the flexible diaphragm 39 makes the valve 45 and stem 53 to reciprocate freely without leakage of water under the ram.

The position of the check valve 44 and obstructing valve 45 and their arrangement to open and close together provides means whereby the ramming effect of the liquid is both downward and upward on the ram unit simultaneously. As a result the efficiency is increased in the operation of the ram through reduction in vibration and friction.

The purpose of tank 10 in the combination is to contain a supply of liquid as of spray material, to be sprayed out under high pressure, and also to cause the material to be continuously agitated by the back surge of the liquid through pipes 41, 15', 11, and 12 and directed laterally by part 32.

Referring to the operation of the apparatus as a whole, prime mover 17 through the shaft 15 rotates the impeller in the centrifugal pump 14. The liquid thus set to flowing through the conduit or drive pipe 41 enters the ram and forces obstruction valve 45 to its seat. The kinetic energy which the column of liquid possesses now forces a portion of the liquid past the valve 44 and into the compression chamber 48. Upon completing the ramming effect, there is a back surge of the liquid through the pipes 41, 15', and 12 and into the reservoir or tank 10 through the inlet means 11. The surging liquid is directed against the bottom of the tank through contact with the interior wall of the bell 32 and forced to move laterally, serving to agitate the liquid so as to keep the mixture thoroughly stirred, as in the case of lime in water as previously referred to. Upon completion of the back surge, the impeller pump 14 again imparts a rapid flow through the drive pipe 41 and valve 45 is again forced to its seat and the result previously described repeats, making it possible to obtain considerable liquid from the compression chamber under high pressure, the ram operating entirely automatically to effect such result.

Said pump 14 continually maintains a head of liquid which causes the liquid to circulate through the pipes 15' and 41 so long as valve 45 is open. When the velocity of this circulation becomes great enough, valve 45 is carried to its seat, or closed. When the rapidly moving column of liquid is brought to a stop very quickly, as is the case, even though a portion of the liquid enters the compression chamber, there is sufficient pressure on that part of the column of liquid nearest the ram and entering it to cause it to slightly decrease in volume. When the force of the blow is spent, the portion of the liquid which has been compressed to a smaller volume now expands but the rapidity of the expansion and elasticity of the liquid causes the liquid to expand to a volume greater than the normal volume of the liquid; thus it can be seen that a small portion of the liquid will be forced backward through the pump very quickly. Now since the liquid has expanded to a volume which is greater than normal, it will again contract. This time a vacuum will be created in conduit 41 and valve 45 will be jerked open, and circulation will begin again through the endless conduit. It is known that liquids are elastic and that great pressure on liquids reduces the volume slightly. To explain the phenomenon of how a vacuum can occur in the pipe which the pump is attempting to keep filled, the contraction of the liquid occurs so very rapidly that the vacuum occurs in spite of the action of the pump. These back surges can be felt by placing the hand near the end of pipe 12 while the unit is operating.

Pump 14 sucks through pipe 12 only one time each stroke. There may be some oscillation of the liquid in and out but only one real suction takes place each stroke. When valve 45 closes and a portion of the liquid enters the compression chamber, if pipe 12 were closed so as not to admit more liquid there would be a vacuum in the conduit 41 whose volume would be exactly equal to the volume of the liquid which entered the compression chamber, but since it is open and connected to a supply of liquid the liquid will rush in. This suction of the liquid through pipe 12 is very easy to feel by placing the hand near the end of the pipe. In fact the action is so positive that there is danger of hurting the hand if it is put over the end of a large suction pipe while the machine is operating.

It will be realized that by reason of the invention, the hydraulic ram is combined with a driven impeller pump to form a pumping unit which is at the same time or simultaneously a low pressure large volume pump and a high pressure smaller volume pump. This combination is very useful, for instance, on a power spraying unit in connection with which it has been described. This arrangement permits the supply tank or reservoir 10 to be quickly filled while operating at low pressure. It will be realized that the invention provides for the location of the diaphragm in the ram so as not to be subjected to the high pressure of the liquid hammer. The invention also eliminates the water hammering due to separation of an obstructing valve and check valve laterally.

Various changes may be resorted to provided they fall within the spirit and scope of the invention.

I claim as my invention:

1. A hydraulic ram, a body having a chamber to receive fluid and a compression chamber, a check valve normally cutting off supply fluid through the body to said chamber, an obstructing valve below said check valve disposed in open position when the check valve is closed, the arrangement of said valves causing the ramming effect of the liquid to be both downward and upward simultaneously, a chamber, the entrance to which is controlled by said obstructing valve, a diaphragm to which said valve is connected arranged out of the high pressure zone of the liquid hammer, and means urging opening of the obstructing valve.

2. A hydraulic ram according to claim 1 wherein the last mentioned means has spring action.

3. A hydraulic ram, a body having a chamber to receive fluid and a compression chamber, a check valve normally cutting off supply fluid through the body to said chamber, an obstructing valve below said check valve disposed in open position when the check valve is closed, the arrangement of said valves causing the ramming effect of the liquid to be both downward and upward simultaneously, a chamber, the entrance to which is controlled by said obstructing valve, a diaphragm to which said valve is connected arranged out of the high pressure zone of the liquid hammer, and means urging opening of the obstructing valve comprising a bar removable with said diaphragm and obstructing valve, contractile spring means connected to the bar, chain means connected to the spring means, and hook means on the ram engageable selectively by links of said chain means.

4. A hydraulic ram, a body having a chamber to receive fluid and a compression chamber, a check valve normally cutting off supply fluid through the body to said chamber, an obstructing valve below said check valve disposed in open position when the check valve is closed, the arrangement of said valves causing the ramming effect of the liquid to be both downward and upward simultaneously, a chamber, the entrance to which is controlled by said obstructing valve, a diaphragm to which said valve is connected arranged out of the high pressure zone of the liquid hammer, means urging opening of the obstructing valve, and means whereby the last mentioned means may be adjusted to vary the resistance offered to the liquid flow past the obstructing valve.

5. A hydraulic ram, a body having a chamber to receive fluid and a compression chamber, a check valve normally cutting off supply fluid through the body to said chamber, an obstructing valve below said check valve disposed in open position when the check valve is closed, the arrangement of said valves causing the ramming effect of the liquid to be both downward and upward simultaneously, an impeller pump means for fluid independently of that to operate the ram having a pipe in communication with the ram below the obstructing valve, and means for securing said obstructing valve closed against its seat so that the impeller pump may operate without passing liquid through the ram.

6. A hydraulic ram, a body having a chamber to receive fluid and a compression chamber, a check valve normally cutting off supply fluid through the body to said chamber, an obstructing valve below said check valve disposed in open position when the check valve is closed, the arrangement of said valves causing the ramming effect of the liquid to be both downward and upward simultaneously, an impeller pump means for fluid independently of that to operate the ram having a pipe in communication with the ram below the obstructing valve, means for securing said obstructing valve closed against its seat so that the impeller pump may operate without passing liquid through the ram, a reservoir with which said pipe is connected to receive its liquid supply, a coupling securing the pipe to the reservoir, a strainer rising from the coupling, and a bell supported by the strainer for the purpose specified.

7. A hydraulic ram, a body having a chamber to receive fluid and a compression chamber, a check valve normally cutting off supply fluid through the body to said chamber, an obstructing valve below said check valve disposed in open position when the check valve is closed, the arrangement of said valves causing the ramming effect of the liquid to be both downward and upward simultaneously, an impeller pump means for fluid independently of that to operate the ram having a pipe in communication with the ram below the obstructing valve, means for securing said obstructing valve closed against its seat so that the impeller pump may operate without passing liquid through the ram, said impeller pump having a valve checked pipe in return communication with the reservoir, a valve inlet pipe in communication with the impeller pump between the same and reservoir, and a cut off valve in the conduit between the reservoir and said last mentioned valve pipe.

JOHN P. WATSON.